United States Patent [19]

Herrmann et al.

[11] 4,008,783
[45] Feb. 22, 1977

[54] HYDRAULICALLY POWERED STEERING SYSTEM FOR A VEHICLE HAVING MULTIPLE STEERABLE WHEELS

[75] Inventors: Hans H. Herrmann; Karl H. Herrmann, both of Seattle, Wash.

[73] Assignee: CTEC Corporation, Bellevue, Wash.

[22] Filed: June 19, 1975

[21] Appl. No.: 588,421

[52] U.S. Cl. ............................................. 180/140
[51] Int. Cl.² ........................................ B62D 5/06
[58] Field of Search ............... 180/79.2 C, 79.2 B, 180/79.2 R, 21, 22, 23, 24, 79.1, 140; 74/567, 568 R, 569, 569 T

[56] References Cited

UNITED STATES PATENTS

| | | | |
|---|---|---|---|
| 2,363,179 | 11/1944 | Harrington et al. | 180/79.2 R |
| 2,391,819 | 12/1945 | Creson | 180/79.2 R |
| 3,252,247 | 5/1966 | Miller et al. | 180/79.1 |
| 3,280,931 | 10/1966 | Cahill et al. | 180/23 |
| 3,372,708 | 3/1968 | Hotchkin | 74/568 |
| 3,433,092 | 3/1969 | Hanyu | 74/568 R |
| 3,438,271 | 4/1969 | Cain | 74/569 |
| 3,572,458 | 3/1971 | Tax | 180/79.1 |
| 3,680,653 | 8/1972 | Murata et al. | 180/23 |
| 3,693,741 | 9/1972 | Scheuerle | 180/23 |
| 3,884,320 | 5/1975 | Leveau | 180/79.2 C |

Primary Examiner—Philip Goodman
Assistant Examiner—David M. Mitchell
Attorney, Agent, or Firm—Christensen, O'Connor, Garrison & Havelka

[57] ABSTRACT

A load transporting vehicle has a plurality of independently steerable wheel sets, each of which incorporates a turntable having a downwardly extending strut and a pivotally mounted trailing arm that carries a pair of wheels. The turntable is rotatably mounted on the vehicle frame. A pair of double acting piston and cylinder assemblies are coupled to rotate the turntable via a rack and pinion. A hydraulic control valve, having a control spool actuated by a boden type cable, controls the flow of hydraulic fluid to the piston and cylinder assemblies.

The linear movement of the boden cable is programmed and controlled by rotatable cams. Three or four sets of cams, each set of which controls a different mode of steering, are mounted on a rotatable shaft. Each set of cams has a single cam to a given boden cable and associated wheel set. The sets of cams are interleaved to form groups corresponding to each wheel set. By axially shifting the shaft, a cam follower connected to the boden cable disengages from one cam and engages a next adjacent cam to change from one mode of steering to another. A cam follower lifting mechanism is provided to raise the followers from the cam surfaces during the shifting procedure.

10 Claims, 19 Drawing Figures

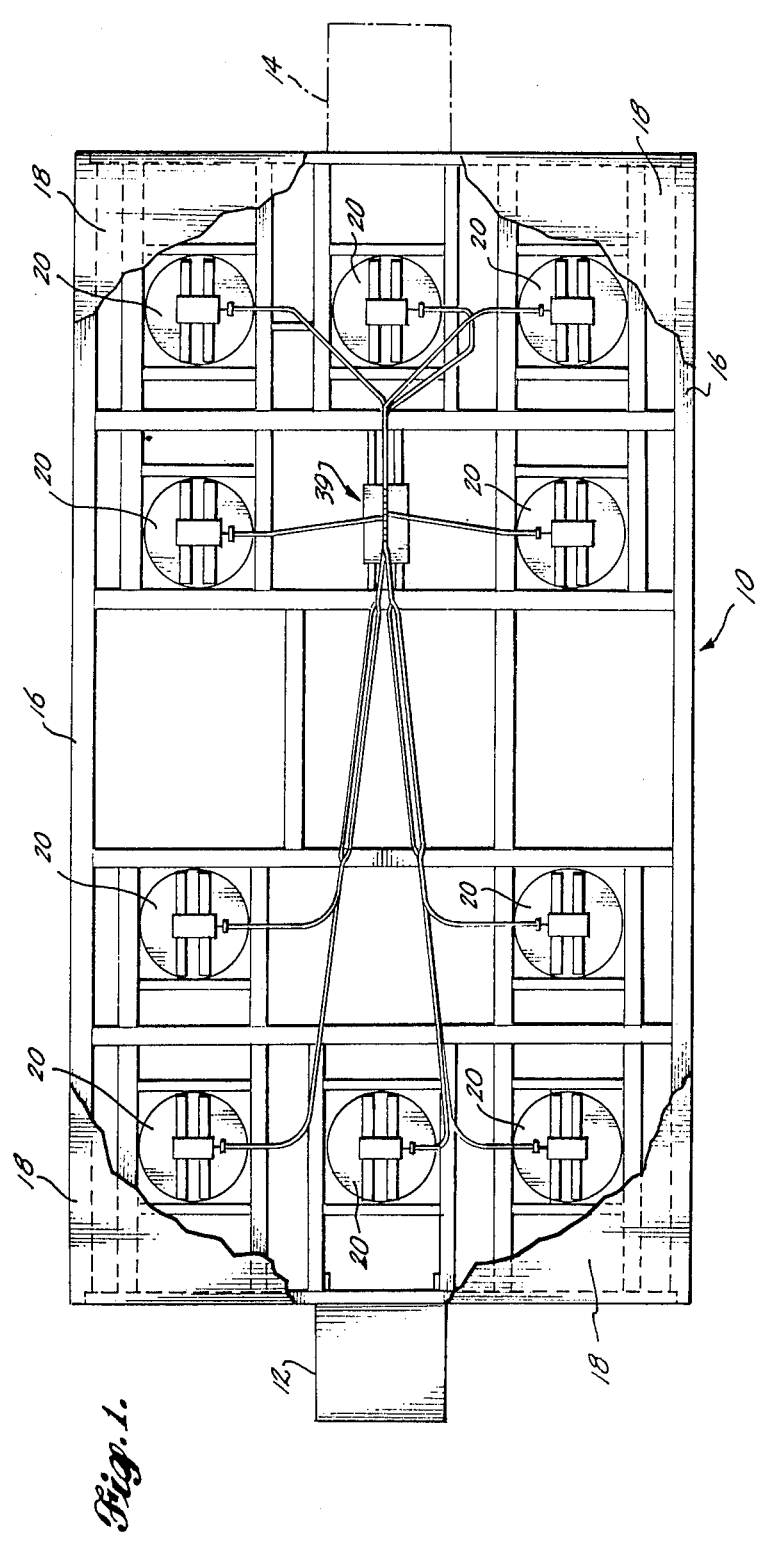
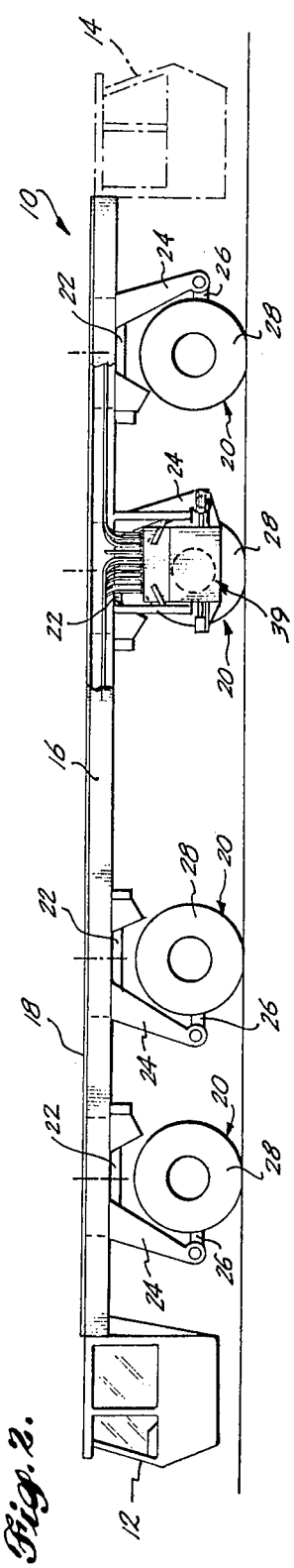
Fig. 1.
Fig. 2.

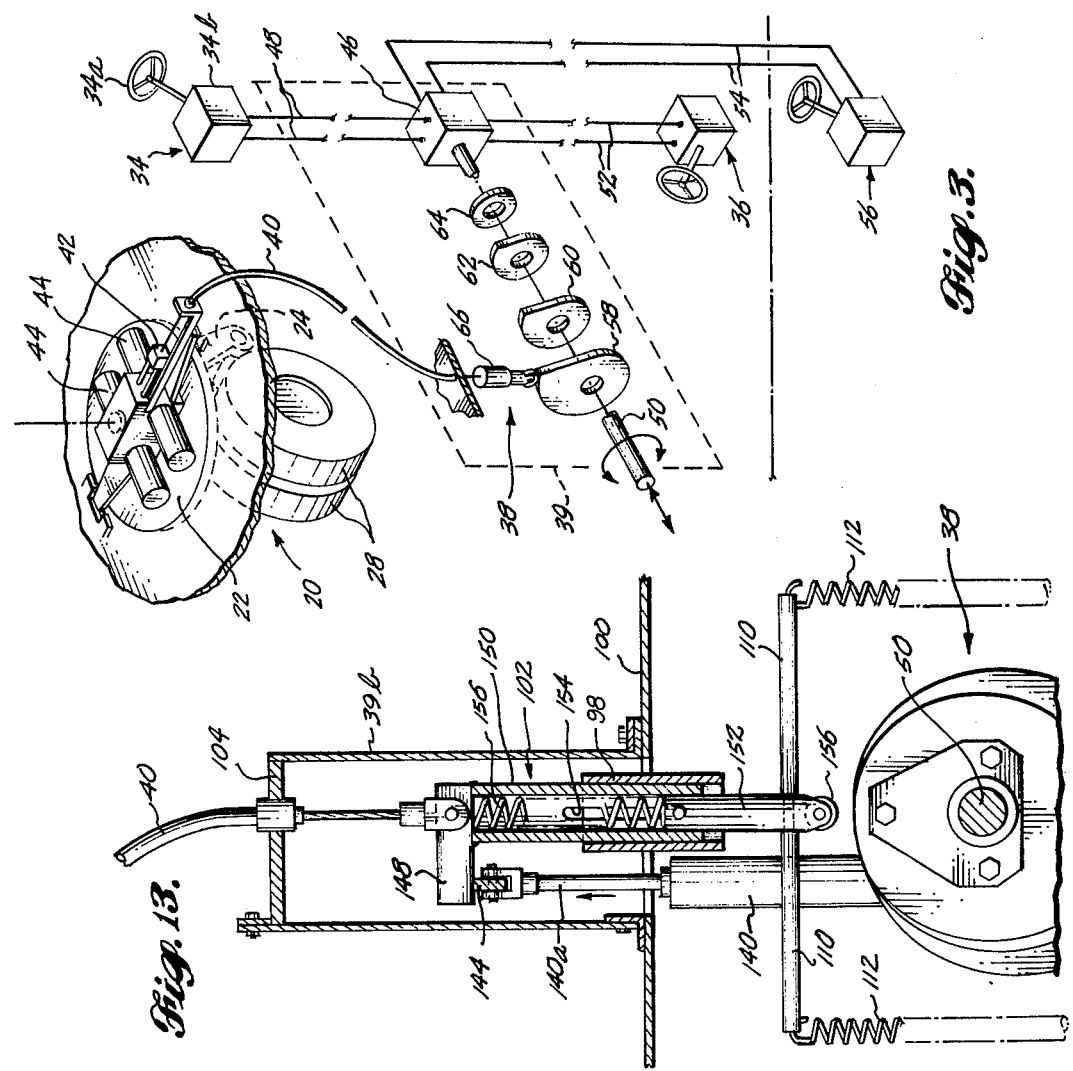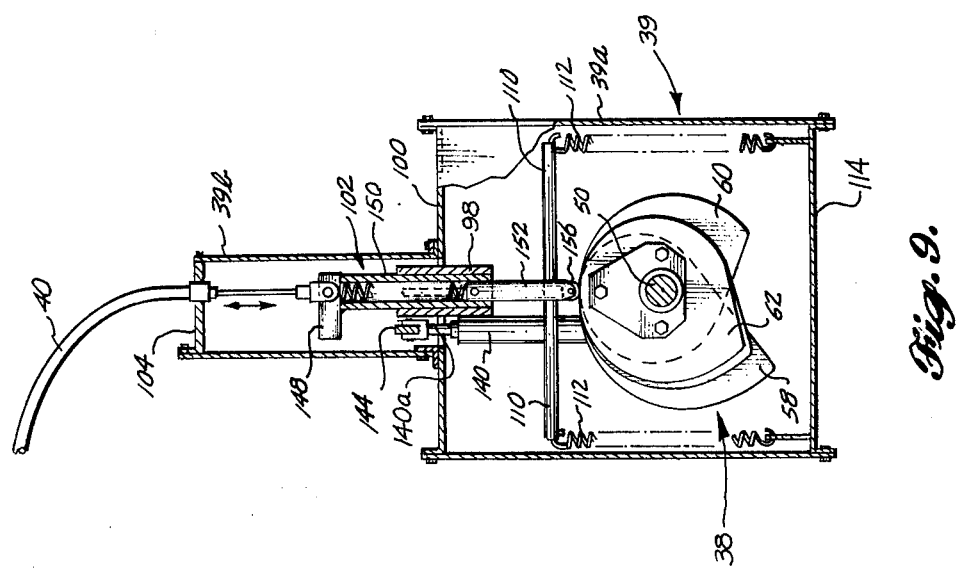

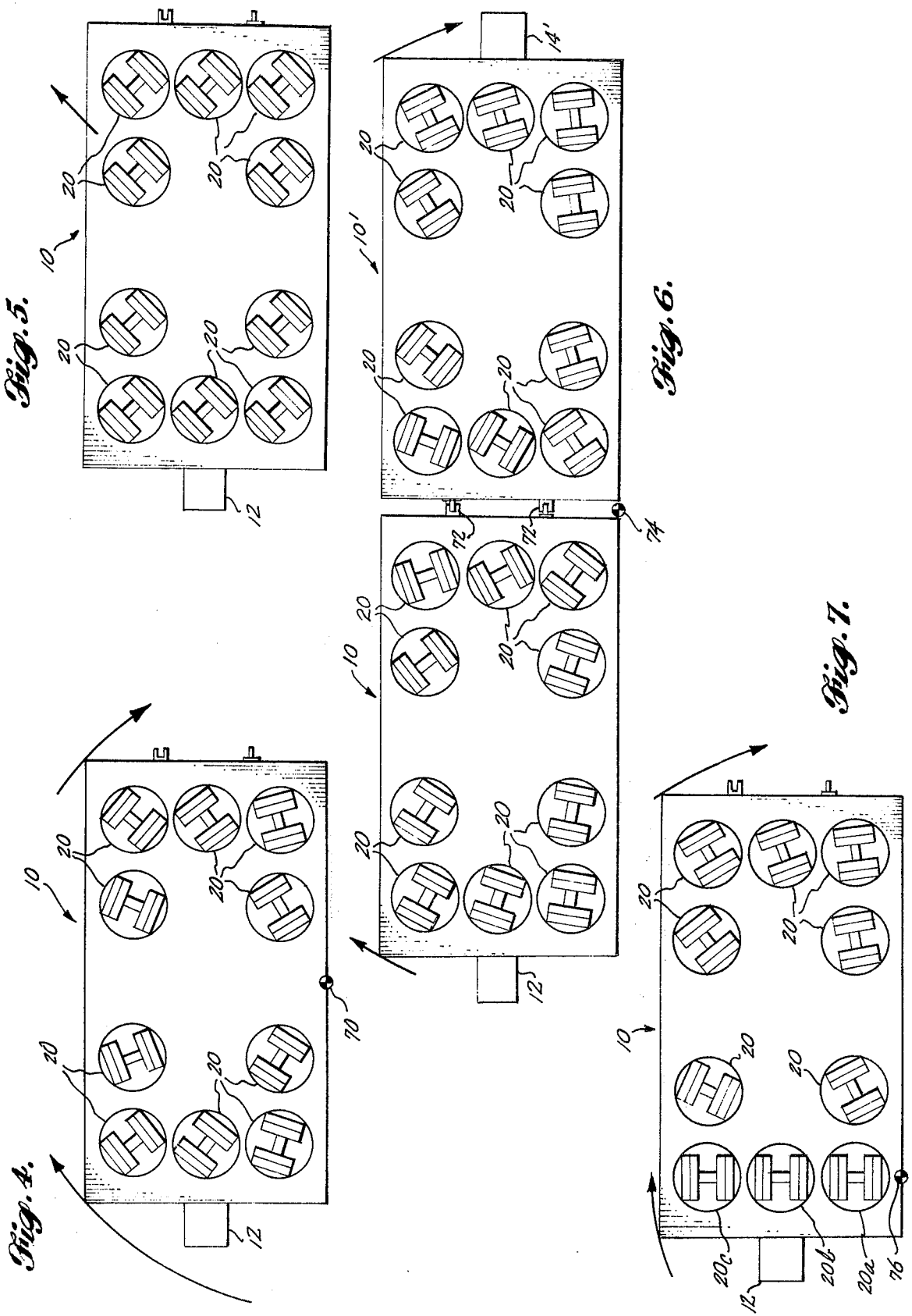

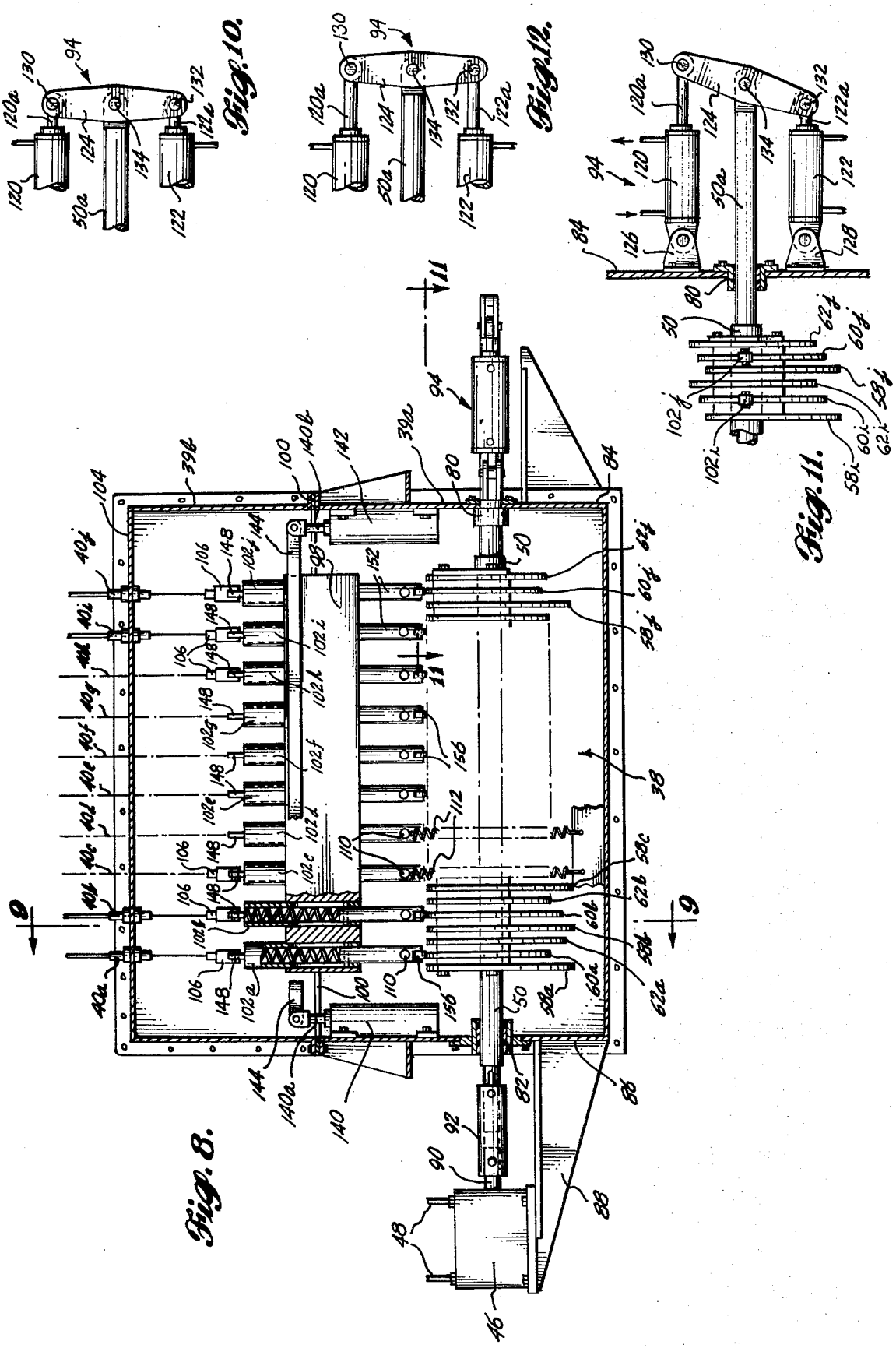

HYDRAULICALLY POWERED STEERING SYSTEM FOR A VEHICLE HAVING MULTIPLE STEERABLE WHEELS

BACKGROUND OF THE INVENTION

The present invention relates to a combination hydraulic and mechanical steering system, and more particularly to such a steering system for a vehicle having multiple independently steerable wheel sets, and most particularly, to a cam assembly for translating the motion of an operator manipulated steering wheel into linear motion for controlling a servomechanism that angularly positions each of the wheel sets in a plurality of different steering modes.

Vehicles used for transporting large loads over relatively small distances, such as from a fabricating section of a shipyard to the assembly section of a shipyard, normally have a plurality of wheel sets supporting a load-bearing platform. Since the loads imposed upon such transporting vehicles are relatively large, the vehicles require a large number of wheels to distribute the load to the ground. The wheel sets are usually differentially steerable to provide adequate maneuvering capability and to eliminate tire scuffing when the vehicle is turned. Prior art transporting vehicles employ steerable wheel sets that provide the capability to turn in a circle whose center is centrally and laterally offset relative to the longitudinal dimension of the transporting vehicle. This mode of steering is normally referred to as the conventional mode. Since the plurality of wheel sets are distributed longitudinally and laterally under the load platform, each of the wheel sets must have a different turning radius relative to the other so that the turning circles for the wheel sets of the entire vehicle will have a common center. One prior art device for differentially steering the wheel sets of a transporting vehicle employs only mechanical linkages between the various wheel sets. The wheel sets are interconnected by a plurality of tie rods of varying lengths coupled to radius arms affixed to the wheel sets, providing the capability to differentially turn each of the independent wheel sets so that for a given steering command, the turning radius of each of the wheel sets coincides with the common center of the desired turning circle.

In many applications it is desirable to be able to change from the conventional steering mode, wherein the transporting vehicle turns about a common center, to what is known as oblique or "crab" steering, wherein each of the wheel sets is turned to an identical angular position so that the entire vehicle can move transversely to its normally longitudinal direction of travel. With the conventional mechanical linkage used in the prior art, it is impossible to change from the conventional mode of steering to the crab mode of steering without a complete changeover of the mechanical tie rod and turning arm linkages. Because replacement of the mechanical steering linkage in this manner is not economically feasible, present transporting vehicles employing a mechanical steering system are offered with only the conventional steering mode. Some vehicles with mechanical steering linkage can be modified to provide oblique steering; however, all wheels are steered at different angles resulting in unacceptable tire scuffing and mechanical stress on the steering system.

In order to provide the capability of changing from a conventional steering mode to a crab steering mode, each of the wheel sets on the transporting vehicle must have the capability of being steered independently while different means for programming the turning angle of each individual wheel set for a given mode of steering must be provided. In U.S. Pat. No. 3,572,458, issued to Hans Tax, a dual mode steering system for individually steering a plurality of wheel sets is disclosed. This dual mode steering system provides the capability of changing between a conventional steering mode and a crab steering mode, as well as other capabilities. In this system a steering wheel is employed to rotate a shaft carrying a set of cams. Each cam corresponds to a given wheel set on a vehicle and has a follower cam that is coupled to an arm of a potentiometer. A variable voltage, depending upon the position of the arm connected to the cam follower, is transmitted through an electronic control circuit to a servomotor, which in turn drives a rotatable shaft on which a wheel is mounted. Feedback from the shaft to the electronic control circuit is provided via a rotational to rectilinear motion transducer, which in turn drives an arm of a second potentiometer. The variable voltage provided to the electronic control circuit from the second potentiometer is conditioned by the circuit to stop the servomotor at the position predetermined by the position of the arm of the first potentiometer. For the conventional steering mode, a first set of cams is employed that have varying cam surfaces, which are related to the desired turn radius for a given wheel set. A second set of cams, each of which is identical to the other, can be interchanged with the first set of cams to angularly position each of the wheel sets to provide the crab mode of steering. Although the system disclosed by Tax employs a workable means by which the steering mode can be changed, it has the drawback of being electronically controlled. The environment in which many transporting vehicles employing multiple wheel sets are used is not conducive to longevity of the electronic circuitry. For example, a transporting vehicle used in a shipyard is constantly subjected to an influx of dirt and saline water that cause corrosion, which results in maladjustment in or inoperability of the electronic steering circuitry. Thus such systems require constant maintenance and because of their electronic complexity require special repair skills not normally found in vehicle maintenance personnel. Moreover, although the system disclosed by Tax employs a means by which the mode of steering can be changed, that system does not provide a means by which the mode of steering can be quickly changed by an operator from his control station.

It is therefore a broad object of the present invention to provide a steering system for a transporting vehicle having a plurality of steerable wheel sets: that provides the capability to independently steer each of the wheel sets according to a predetermined program; that provides the capability to change quickly among several steering modes, including the conventional steering mode, the crab steering mode, and other modes; that eliminates electronics from the steering control system; that is relatively easy to maintain, that can withstand the adverse environmental conditions, that can be maintained and repaired by one of ordinary skill in vehicle maintenance; that provides a plurality of cam sets, each set corresponding to a given steering mode; and that employs protective devices by which injury to the cam sets or the actuating mechanism can be prevented should part of the overall mechanism become inoperative.

SUMMARY OF THE INVENTION

In accordance with the foregoing objects, and other objects that will become apparent to one of ordinary skill in the art upon reading the following specification, the present invention provides an improvement in a multiple mode steering system for a wheeled vehicle. The steering system includes a vehicle frame, a steerable wheel supporting member mounted for rotation about an axis on the frame, a reversible motor means for varying the angular position of the steerable member relative to the frame, and a servomechanism operably coupled to the motor means and having a control member for controlling the motor means. The improvement comprises a first cam and a second cam, each of which has a predetermined shape and rotational axis, interconnected by a coupling means. The coupling means is mounted to rotate the cams about their respective rotational axes. An operator controlled steering means is operably connected to rotate the cams responsive to operator command. A follower means contacts the first cam and converts the rotational movement of the first cam into linear movement in the follower. The follower means is operably coupled to actuate the control member of the servomechanism to control the motor means, and in turn steer the wheel supporting member. Means is provided for relatively axially shifting the first and second cams and the follower means so that the follower means can be disengaged from the first cam and shifted to contact the second cam, thereby enabling it to convert the rotary movement of the second cam into linear movement to actuate the control member of the servomechanism. The invention further provides a unique mounting system and shift mechanism for a plurality of cam sets mounted on a single rotatable shaft. The shaft is axially shiftable by a fluid motor to at least three different positions. The cam sets are so arranged on the shaft relative to a plurality of followers so that the followers simultaneously disengage from a first set of cams and re-engage a second set of cams after the cam mounting shaft has been shifted. In addition, the present invention provides a combination steering system for a transporting vehicle that allows each of the wheel sets to be independently steered and which enables the steering mode of the transporting vehicle to be quickly changed from a conventional steering mode, to a crab steering mode, to an altered conventional steering mode wherein two transporting vehicles are interconnected in end-to-end relationship, and a fourth steering mode that allows the rear wheels of the vehicle to track or follow the remaining wheels, i.e. the rear wheels of the vehicle are held in a forwardly directed steering position as the remaining wheels are angularly positioned to turn the forward portion of the transporting vehicle.

BRIEF DESCRIPTION OF THE DRAWINGS

A better understanding of the present invention can be derived by reading the ensuing specification in conjunction with the accompanying drawings wherein:

FIGS. 1 and 2 are plan and side elevation views of a transporter employing the hydraulic steering system according to the present invention;

FIG. 3 is a schematic representation of the steering system showing various operator locations, a steerable wheel set, a control cable for controlling the hydraulic power means, and a means for positioning the control cable responsive to the operator's command from the steering location;

FIGS. 4, 5, 6 and 7 are schematic plan views of the wheel positions of the transporter as controlled by the steering system of the present invention in the conventional steering mode, the crab steering mode, the end-to-end coupled conventional steering mode, and the tracking steering mode, respectively;

FIG. 8 is an elevation view in partial cross section of the cam housing and programmed cam assembly of the present invention;

FIG. 9 is a cross-sectional view of the cam housing and assembly of FIG. 8 taken along section line 9—9;

FIGS. 10, 11 and 12 are plan views, in partial cross section and partially broken away, of the shifting mechanism associated with the cam assembly illustrated in FIGS. 8 and 9 showing, respectively, first, second and third positions of the shift mechanism;

FIG. 13 is an enlarged cross-sectional view similar to that of FIG. 9 showing the construction of the cam follower and the follower lifting mechanism as operated when the cam assembly is being shifted;

DESCRIPTION OF PREFERRED EMBODIMENT

Figure 14:
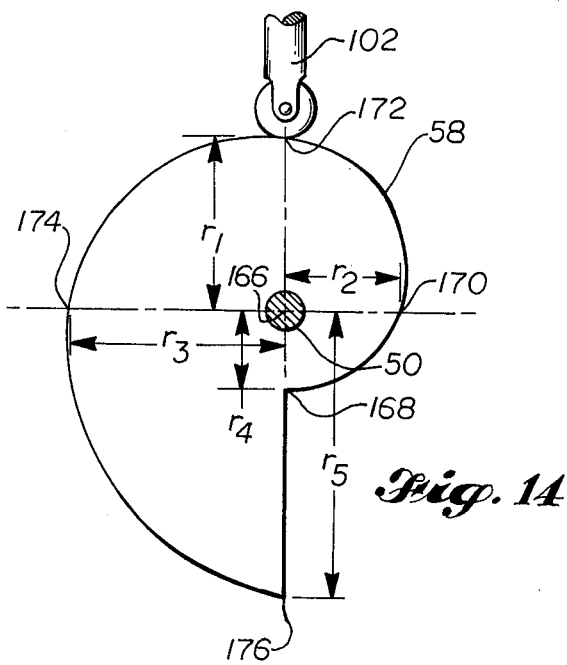
FIG. 14 is a typical cam employed with the cam assembly of the present invention.

Referring first to FIGS. 1 and 2 a load transporting vehicle or transporter, generally designated 10, has operator's cabs 12 and 14 mounted at the longitudinal ends of a platform supporting, frame assembly 16. The platform 18 is broken away in the plan view to expose the frame assembly 16 and the location of the multiple wheel sets 20, which support the transporter for traverse over the ground. Each of the wheel sets comprises a turntable 22 to which is affixed a downwardly extending wheel supporting arm 24. A wheel suspension arm 26 is pivotally attached at its one end to the bottom of the downwardly extending wheel supporting arm 24. A dual set of wheels 28 is rotatably mounted at the other end of the trailing arm 26. Each of the turntables 22 is mounted for rotation relative to the frame 16 about a vertically oriented axis, i.e., an axis perpendicular to or transverse to the rotational axis of the wheels 28. A hydraulic piston and cylinder assembly having an integral shock absorber (not shown) is interconnected between the trailing arm 26 and the main wheel supporting arm 24 or the turntable 22 to fix the trailing arm in a predetermined position. By supplying fluid to or exhausting fluid from this piston and cylinder assembly, the trailing arm 26 can be swung about its pivotal connection to the main support arm 24 to raise and lower the platform of the transporter relative to the ground. Thus, the transporter when in its lowered position can be driven under a load statically supported above the ground and can then be raised to elevate the load above its static support so that the load can be transported to a desired location. In this embodiment, ten wheel sets are employed, with three transversely or laterally spaced wheel sets being positioned adjacent each of the longitudinal ends of the frame 16 and two wheel sets being spaced longitudinally inwardly from the three endmost wheel sets. It is to be understood by one of ordinary skill in the art that any number of wheel sets, preferably from four to 10 or more can be used, dependent upon the physical size of the transporter and the gross vehicle weight for which it is designed.

Referring now to FIG. 3 in conjunction with FIGS. 1 and 2, the steering system for the transporter includes operator controlled steering stations 34 and 36 in each of the operator cabs 12 and 14, which can individually control a cam assembly 38 enclosed by a housing 39 shown in dotted outline, an actuating cable 40, which in turn actuates a hydraulic control valve 42 for the hydraulic power means 44 that rotates the turntable of the wheel set 20. Each of the steering stations 34 and 36 comprises a steering wheel 34a coupled to a conventional hydraulic power steering servomechanism 34b, which is coupled to a servomotor 46 in the cam assembly 38 via hydraulic conduits 48. When the steering wheel is turned, a shaft 50, coupled to the hydraulic servomotor 46, is rotated a predetermined amount dependent upon the operator's angular movement of the steering wheel. Likewise, the steering station 36 is coupled via hydraulic conduits 52 to the hydraulic servomotor 46. In addition, a third set of hydraulic lines 54 are provided so that a third steering station 56 on a second transporter can be coupled to the servomotor 46 in the event that more than two transporters are coupled in end to end relationship to carry loads larger than that for which a single transporter is designed. A plurality of cams 58, 60, 62 and 64, each of which has a cam surface of predetermined shape, is affixed to the shaft 50 in the cam assembly housing 39. Four cams are provided for each of the wheel sets on the transporter. Only one sub-set is shown in FIG. 3; however, it is to be understood that a sub-set of four cams is provided for each of the ten steerable wheel sets in the transporting vehicle shown in FIGS. 1 and 2. Cam 58 is a corresponding one of an interrelated set of cams that moves the cable 40 to actuate the control valve 42 to correctly position the turntable 40 according to a first desired mode of steering, for example, the conventional steering mode. The second cam 60 is a corresponding one of a second set of cams that actuates the control valve 42 according to a second mode of steering, for example the crab steering mode. Additional modes of steering are provided by third and fourth sets of cams of which cam 62 and 64 are respectively corresponding ones for the wheel set 20 shown in FIG. 3. The third mode of steering can be one that is provided for steering an end-to-end coupling of two transporters in a conventional mode. The fourth mode of steering can be provided to steer the transporter in a tracking mode, i.e, a mode wherein the rear wheels are not repositioned angularly when the wheels forward of the rear wheels are steered, thus requiring the rear wheels to track or follow the turning wheels to prevent the rear of the vehicle from swinging outwardly as the vehicle turns. In the tracking mode of steering the center of the turning circle for all wheel sets resides on a transverse line through the axles of the rear wheel sets.

As shown in FIG. 3, a cam follower 66 is positioned to contact and follow the cam surface of cam 58. The follower 66 is attached to the cable of the sheathed cable assembly 40, commonly known as a boden cable. One end of the sheath of the boden cable 40 is affixed to the cam assembly housing 39 while the other end of the cable travels to its corresponding wheel assembly where the other end of the sheath is fixed relative to the turntable as will be described in greater detail below. The cam follower 66 is coupled to the cable that reciprocates within the sheath. The end of the cable opposite that attached to the follower 66 is affixed to the control member, such as the control spool, within the control valve 42. Thus, as the steering wheel in a given one of the steering stations 34, 36 or 56 is rotated, the shaft 50 is rotated via the hydraulic servomotor 46 in turn rotating the cam 58. As the cam 58 rotates the movement of the follower 66 will reposition the cable relative to its sheath and in turn actuate the control member of the hydraulic control valve 42. Thus a given setting of the steering wheel as manipulated by an operator will cause the end of the cable coupled to the control member of the hydraulic control valve 42 to move to a new position corresponding to the degree of rotation of the cam 58. As disclosed in the copending application to Weyer filed on an even date herewith and expressly incorporated herein by reference, Ser. No. 588,422, filed June 19, 1975 the entire assembly of four sets of cams is mounted on a single shaft 50 that can be axially shifted. In this manner the mode of steering can quickly be changed at the operator's command and by relatively repositioning the follower 66 coupled to the cable 40 over the appropriate cam for each wheel set.

Referring now to FIG. 4, the transporter 10 is shown with its wheel sets 20 being steered in the conventional steering mode. In the conventional steering mode, the rotational axes of each of the wheel sets intersect at a common center. As the transporter is steered in a smaller turning circle, the center moves closer to the vehicle. The common center 70 is representative of the minimum turning circle of the transporter in the conventional steering mode. In the conventional steering mode, each of the wheel sets is positioned at a different angle for a given turning circle. The angular positioning of each of the wheel sets is programmed into a cam set having an appropriately shaped cam for each of the wheel sets for actuating the hydraulic servomechanism to position the respective wheel set.

FIG. 5 schematically illustrates the crab or oblique steering mode in which each of the wheel sets 20 is rotated to the same relative angle in response to a steering command by the operator. In this manner, the transporter 10 can move obliquely from its normally longitudinal direction of travel. The cam set for the crab mode of steering can be so configured as to allow the transporter to move perpendicularly to its normal longitudinal direction of travel as well as all in directions intermediate the forward and perpendicular directions. As shown in FIG. 5, each of the wheel sets have been rotated through 45° so that the orientation of the transporter itself remains parallel to its original direction of travel, but can move obliquely in a direction 45° from its longitudinal direction of travel.

FIG. 6 schematically illustrates a first transporter 10 and a second transporter 10' connected in end-to-end relationship by suitable coupling means 72. As coupled, the transporters can be controlled from either a cab 12 on the transporter 10 or a cab 14' on the transporter 10'. A third cam set can be provided in the cam assembly of the present invention so that the transporters 10 and 10' can be steered in a conventional manner about a minimum turning circle having its center located at point 74, which lies on a line perpendicular to the longitudinal direction of travel and centered between the coupled ends of the transporters 10 and 10'. As can be seen, the rotational axes of the wheels of each of the wheel sets pass through the center point 74, defining the minimum turning radius of the coupled transporters. It is to be understood that in the conventional steering modes in FIGS. 4 and 6 that a greater turning radius is achieved by moving the center of the common turning circle transversely outwardly away from the side of the transporters. When the transporters are moving straight ahead, i.e., in a longitudinal direction, the rotational axes of all the wheel sets are parallel and the center of the turning circle lies at infinity.

FIG. 7 is a schematic illustration of the transporter 10 in what is referred to as the tracking mode of steering. In this mode of steering, the center of the turning circle when at its minimum is located at point 76 along the longitudinal side of the transporter. The center of the turning circle in the tracking mode lies on the coincident rotational axes of the wheels on the rear wheel sets 20a, 20b and 20c. The remaining wheel sets 20 are controlled by a fourth cam set provided in the cam assembly so that the rotational axes of the wheels of each wheel set intersect at the common center lying along the rear wheel rotational axes. In this manner, the transporter can be steered in a manner similar to that of an ordinary vehicle wherein the rear wheel sets do not rotate responsive to an operator command but only the wheel sets forwardly of the rear wheel sets. In this manner, the rear portion of the transporter 10 does not swing outwardly when the vehicle is turned, but the forward end of the vehicle turns at a greater rate than in the conventional steering mode.

The cam group or subset illustrated in FIG. 3, including cams 58, 60, 62 and 64, are representative of the cam subset for one of the rear wheel sets 20a, 20b or 20c of the transporter 10. As illustrated, the cam 58 is one cam of the set for the conventional steering mode to steer the vehicle as shown in FIG. 4. The cam 60 is one cam of the crab steering set to steer the transporter 10 in the manner illustrated in FIG. 5. Likewise, the cam 62 is one cam of the end-to-end coupled, conventional steering mode set for steering the end-to-end coupled transporters 10 and 10' in a manner similar to that illustrated in FIG. 6. The cam 64 is a corresponding one of the cam set for steering the transporter 10 in the tracking mode of steering as illustrated in FIG. 7.

Referring now to FIGS. 8 and 9 illustrating the preferred embodiment of the cam assembly of the present invention, the cam assembly is the mechanism into which the angular positioning of each of the wheel sets is programmed for a given steering mode. The cam assembly, generally designated 38, resides in a structure serving both as a frame and a housing. The housing consists of a lower box-like portion 39a and an upper box-like portion 39b. The cam shaft 50 is mounted in suitable bearings 80 and 82 affixed to the lateral end walls of the lower portion 39a of the housing. The shaft 50 extends longitudinally through the housing 39 and protrudes through the bearings 80 and 82 beyond each of the end walls 84 and 86. A steering servomotor 46 is mounted on a bracket 88 that is fixed to the one end wall 86 and extends longitudinally outwardly therefrom. The rotary drive shaft 90 of the steering servomotor 46 is coupled to the shaft 50 by a rotary coupling 92. In this embodiment, the steering servomotor 46 is a rotary hydraulic motor coupled to the power steering assembly 34 (shown in FIG. 3) via conduits 48.

Still referring to FIGS. 8 and 9, a plurality of cams 58, 60 and 62 are affixed to the shaft 50 so that their rotational axes are coincident with the rotational axis of the shaft 50. A first set of cams 58a through 58j, for example, for a conventional steering mode, are mounted in spaced relationship along the shaft. A second set of cams 60a through 60j and a third set of cams 62a through 62j are interleaved between each other and the first set of cams 58a through 58j so that a first grouping or subset comprises cams 58a, 60a and 62a. A second grouping of cams comprises cams 58b, 60b and 62b on down to a final grouping of cams comprising 58j, 60j and 62j. Each subset or group of cams corresponds to a given wheel set.

A shifting mechanism, generally designated 94, is coupled to the end of the shaft 50 opposite to the steering servomotor 46. The shifting mechanism 94 is mounted on a longitudinally outwardly extending bracket 96 affixed to the end wall 84 of the lower portion 39a of the cam assembly housing. The shift mechanism 94, which will be described in greater detail below, can axially shift and position the shaft 50 in any one of three positions, corresponding to first, second and third steering modes. It will be understood by one of ordinary skill in the art that two or more steering modes can be provided by increasing or decreasing the number of cam sets, and correspondingly the number of cams in each subset from the three cams as illustrated in the preferred embodiment and by providing the shifting mechanism 94 with the capability to shift the shaft to an increased number of axial positions corresponding to the number of cams in each subset.

A guideblock 98 is mounted in an aperture provided in the top wall 100 of the lower portion 93a of the cam assembly housing. The guideblock 98 carries a plurality of bores, equaling the number of cam subsets. The bores are parallel to each other and aligned radially relative to the shaft 50 and to the cams 58, 60 and 62. Cam followers generally designated 102, are mounted for reciprocating movement in each of the bores. The cam followers are respectively positioned over the location of each of the cam subsets 58, 60 and 62. For example, the cam follower 102a is positioned relative to the cam subset comprising cams 58a, 60a and 62a so that when the shift mechanism 94 positions the shaft 50 in a first position, the follower will reside on and follow the cam surface of cam 58a. When the shift mechanism 94 shifts the shaft 50 to its second position axially offset from its first position, the cam follower 102a will engage and follow the cam surface of cam 60a as illustrated. Likewise, when the shift mechanism shifts the shaft 50 to its third position axially offset from the first and second positions, the cam follower 102a will disengage from the surface of cam 60a and be re-engaged upon the cam surface of cam 62a. Each of the cam followers 102a through 102j are respectively coupled to a cable 40 mounted for linear movement within its corresponding sheath. Such cables are commonly available and conventionally referred to as boden cables. Each of the boden cables 40a through 40j has its respective sheath affixed to the top wall 104 of the upper portion 39b of the housing 39. The upper portion 39b of the housing is mounted on the top wall 100 of the lower portion 39a of the housing and encloses the upper portion of each of the followers 102 as well as the terminus of the boden cables. Each of the cables 40 are coupled by appropriate connectors 106 to the upper ends of the followers 102 that project upwardly from the top of the guideblock 98. Thus, as the shaft 50 is rotated via the steering servomotor 46, each of the followers 102 will rest upon and follow the surface of its respective cam. As the shaft 50 is rotated, the followers 102 will reciprocate within their respective bores in the guide block 98, thus providing linear bidirectional movement to the cable portion of the boden cables 40, which in turn actuates the hydraulic control valve 42 of its corresponding wheel set.

As best seen by referring to FIGS. 9 and 13, a lift bar 110 is affixed to the lower portion of each one of the followers 102. The lift bar 110 is oriented transversely relative to the reciprocation direction of the followers 102 as well as being oriented transversely to the rotational axis of the cam shaft 50. The lift bar 110 extends in a mutually opposite direction from the followers 102 and terminates at each end at a location within the lower portion 39a of the housing and at a location spaced outwardly from the periphery of the cams 58 through 62. Springs 112 are coupled to the ends of the bar 110 and are strung in tension downwardly from the ends of the bar 110 and affixed to the floor 114 of the lower portion 39a of the housing. In this manner, the follower 102 is biased in a downward direction so that it is held securely on the peripheral cam surface of the particular cam that it is contacting. Thus, as the cam shaft 50 is rotated and the radius of a given cam upon which one of the followers 102 resides decreases, the cam follower will be biased downwardly so as to accurately follow the surface of the cam. Likewise, the springs 112 have sufficient elasticity so that as the radius of a given cam increases, the cam follower 102 will reciprocate in its bore in the guide block 98 upwardly against the tension of the springs 112.

Referring now to FIGS. 10, 11 and 12, the preferred embodiment of the shift mechanism 94 comprises a pair of fluid actuated, linearly acting piston and cylinder assemblies 120 and 122 coupled to an extension 50a of the cam shaft 50 by a link 124. The cam shaft extension 50a is axially aligned with the cam shaft 50. Each of the piston and cylinder assemblies 120 and 122 are positioned on mutually opposite sides of the shaft extension 50a and are pivotally attached respectively to yokes 126 and 128, which are in turn affixed to and extend outwardly from the side wall 84 of the lower portion of the cam assembly housing. A cam shaft extension arm 50a is affixed to the cam shaft 50 by conventional means (not shown) that allows the cam shaft 50 to rotate relative to the extension 50a but which fixes the cam shaft extension 50a to the cam shaft so that no relative axial movement can occur between the two. The piston arm 120a of the piston and cylinder assembly 120 is pivotally attached by a pin 130 to one end of the link 124. The piston arm 122a of the piston and cylinder assembly 122 is pivotally attached via pin 132 to the opposite end of the link 124. The link in turn is pivotally attached at a location intermediate the pivot pins 130 and 132 to the cam shaft extension 50a via pin 134. The pivotal axes of all of the connections to the link 124 are mutually parallel. The pivotal axis of the connection between the cam shaft extension 50a and link 124 is oriented diametrically to the longitudinal axis of the cam shaft extension 50a and diametrically to the axis of rotation of the cam shaft 50.

Each of the piston and cylinder assemblies 120 and 122 can be of the two position, single acting, pneumatic or hydraulic type wherein the piston and corresponding piston rod are biased in a first direction by means of an internal spring (not shown). Upon application of fluid pressure within the cylinder, the piston and corresponding piston arm moves rectilinearly to its maximum extension. Upon relief of pressure within the cylinder the internal spring returns the piston and corresponding piston arm to its first position.

In operation, the piston and cylinder assemblies are both biased toward their respective first positions as shown in FIG. 10. In this embodiment the piston arms 122a and 120a are biased outwardly from the housing. The corresponding cam followers 102 reside over and contact the surfaces of cam set 58 corresponding, for example, to the conventional steering mode. When fluid pressure is applied to one of the cylinders via an operator control (not shown) one of the piston arms, for example piston arm 122 of assembly 122, will retract to its maximum extent causing the link 124 to angulate relative to the extension 50a and move inwardly toward the cam assembly. This movement of the link 124 will cause a corresponding axial displacement of the cam shaft extension 50a and consequently of the cam shaft 50. In this manner, the followers are positioned over the second set of cams 60 corresponding to the crab steering mode (as specifically illustrated in FIG. 11). To shift the cam assembly so that the followers 102 reside over and contact the surface of the third set of cams 62, fluid pressure is applied to the second piston and cylinder assembly 120 causing the piston arm 120a to retract against its internal biasing spring. The other end of the link 124 is thus moved toward the cam assembly housing (as shown in FIG. 12) and is realigned in an orientation parallel to its original orientation. In this manner, the movement of the link 124 is translated to the cam shaft extension 50a, causing the cam shaft 50 to again axially shift so that the set of cams 62, for example corresponding to the end-to-end coupled steering mode, resides under the followers 102. When it is desired to return to the first steering mode, the fluid pressure is relieved from the cylinders, causing the link 124 to reassume its original position and to axially shift the cam shaft 50 so that the followers reside over the cam set 58.

As best seen in FIG. 9, each of the cams of all of the cam sets has a common and equal radius that is related to the straight ahead positioning of each of the wheel sets for travel in the straight ahead longitudinal direction. This is the position at which the cams are shown in FIG. 9. On either side of this position the cam surfaces begin to vary relative to one another. It is most desirable that shifting between modes of steering, i.e., shifting the cam sets so that a different set will reside under the followers 102, be accomplished only when the cams are angularly positioned so that all of the followers are at an equal height, i.e., linearly aligned parallel to the rotational axis of the cam shaft 50. If, however, the cam shaft 50 is axially shifted at this location the biasing force of the springs 112 will cause the cam follower to move downwardly into the space between adjacent cams as the cam shaft is shifted. This would result in an undesirable lateral force being placed on the cams as the next adjacent cam bears against it. Moreover, the operator would have to manually reset the followers on the cams upon shifting. To solve this problem, a means for lifting the cam followers a small distance above the respective cam surfaces is provided.

Referring to FIG. 13 in conjunction with FIGS. 8 and 9, each of the followers 102 is provided with a transversely extending arm 148 attached to its upper end. The transversely extending arm terminates short of the sidewall of the upper portion 39b of the housing. A pair of fluid actuated piston and cylinder assemblies, generally designated 140 and 142, are mounted on the inner surface of the end walls of the lower portion 39a of the housing 39. The assemblies are oriented so that the respective piston arms 140a and 140b are mounted for reciprocating movement in a direction generally parallel to the reciprocation direction of the followers 102. A bar 144, oriented generally parallel to the rotational axis of the cam shaft 50 and transversely to the direction of reciprocation of the followers, is connected between the upper ends of the piston arms 140a and 140b. The travel of the piston arms 140a and 140b is chosen such that at the lower extent of their travel the bar 144 resides below the bottom surface of the transversely extending arms 148 on the upper ends of each of the cam followers. The upper limit of travel of the piston arms 140a and 140b is chosen such that the bar 144 is raised upon simultaneous actuation of the assemblies 140 and 142 a sufficient distance to contact the lower edge of the transverse arms 148 and to lift the arms 148 and consequently the followers 102 a very small distance, on the order of an eighth of an inch or less. In this manner, the bottom end of the followers normally residing on the cams is lifted above the cam surface so that the cam shaft 50 and the corresponding cams can be axially shifted without interference from the cam followers. The piston and cylinder assemblies 140 and 142 can be of conventional hydraulic or pneumatic type. Preferably they are of the single acting type that are biased in a downward direction by an internal spring or other biasing means (not shown). In this manner, the piston arms 140a and 140b will normally reside at the bottom end of their respective strokes, thus preventing interference between the lift arm 144 and the transverse arms 148 on the cam followers as the followers 102 ride upon the respective cam surfaces.

The cam followers 102 are also provided with means for preventing damage to the cams and/or to the boden cable and corresponding control valves. Referring to FIGS. 8, 9 and 13 each of the cam followers comprises a tube 150 in which is reciprocally mounted a bar or rod 152. The tube 150 contains a diametrically oriented and longitudinally extending slot 154 that terminates short of the bottom end of the tube. A spring 156 is mounted in the tube 150 and bears against the closed upper end of the tube 150 and against the top end of the rod 152. A pin inserted through a diametrical bore in the rod 152 and through the slot 154 in the tube 150 retains the rod 152 within the tube. The lower end of the rod 152 carries a cam following wheel 156 mounted for rotation on the lower end of the rod 152. If the control valve or boden cable or other mechanism is damaged to an extent that the tube 150 cannot move in an upward direction when the radius of a cam increases, the rod 152 can move upwardly within the tube 150 against the compression of spring 156. In this manner, further damage to the remaining portion of the mechanism is prevented.

As can be seen by reference to the aforementioned copending patent application, expressly incorporated herein by reference, and by reference to FIG. 3 hereof, the rotational drive mechanism of the present invention for steering the individual wheel sets is responsive to linear movement of a boden cable or other linear actuating device that is coupled between the cam assembly and a control member of a servomechanism for angularly positioning a given wheel set. As disclosed in the aforementioned patent application, the servomechanism can be a hydraulic control valve incorporating a unique feedback mechanism for stopping the rotation of the wheel set at a location responsive to the position of the actuating end of the boden cable or other linear actuator relative to the servomechanism. In the preferred embodiment of the servomechanism, the control member, the control spool of the hydraulic valve, is responsive to linear movement. The feedback to the control spool is also linear in nature. Thus, for a given linear movement of the boden cable, a corresponding angular repositioning of the wheel set will occur. That is, if the actuating member moves ¼ of 1 inch in a given direction from a centered location, the wheel set will rotate through a predetermined angle in a first rotational direction. The wheel set will likewise move through the same angle in the opposite direction when the actuating member is moved through the same distance in an opposite direction.

Referring now to FIG. 14, a typical cam 58 is incorporated in the cam assembly has a central rotational axis corresponding to the rotational axis of the shaft 50 to which the cam is affixed. The cam 58 has an ever-increasing radius from a point 168 of minimum radius in a counterclockwise direction to a point 176 of maximum radius. Both points 168 and 176 on the surface of the cam lie on a common radial line directed outwardly from the rotational axis of the cam. One of ordinary skill in the art will recognize that for a given turning circle for the transporter, each of the wheel sets must be rotated through a predetermined angle so that the turning circles of each of the wheel sets lies at a common center (for the conventional mode of steering). Thus, each corresponding cam in the conventional steering mode set must be designed so as to move the boden cable 102 through a predetermined distance to actuate the servomechanism to angularly position the corresponding wheel set. Dependent upon the chosen steering mode, each cam in a set corresponding to a given steering mode, will have a predetermined surface curvature. For example, all the cams of the cam set designed for the crab mode of steering will be identical. For the conventional mode of steering both for a single transporter and for end-to-end coupled transporters, each of the cams in the set will be different from each of the other cams. For a tracking steering mode as described above the tracking wheels (the rear wheels) will all have cams identical to each other and in the case of the tracking mode will be circular, as it is not desired for the rear wheels to turn in the tracking mode. However, all wheels forwardly of the tracking wheels will have turning angles programmed by cams each of which have a different cam surface shape.

Figure 15A:
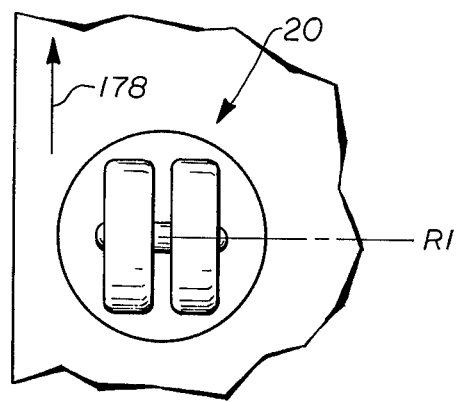
FIGS. 15a, 15b, 15c, 15d, and 15e are schematic views of the wheel positions as related to the typical cam illustrated in FIG. 14.
Figure 15B:
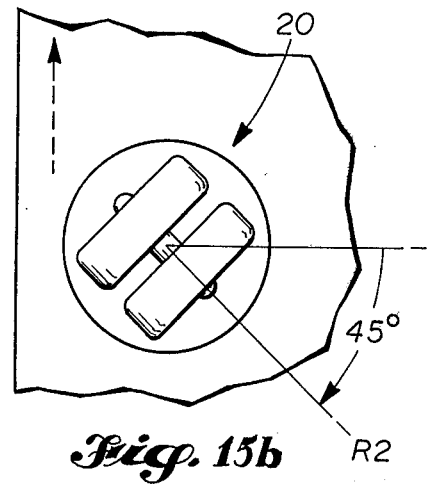

Again referring to FIG. 14 a typical simplified cam is illustrated wherein, the radius $r_1$ of the cam lying on a common diameter with the minimum and maximum radius locations but on the diametric side of the rotational axis is chosen as the centering point for the wheel set 20 shown in FIG. 15a. Thus, when the cam follower 102 is positioned at point 172 lying on radius $r_1$, the wheel set 20 is adjusted to direct the vehicle in its straight ahead, longitudinal direction of travel indicated by arrow 178. In other words the radius $r_1$ of the cam 58 corresponds to an infinitely long turning radius $R_1$ for the wheel set 20. When the cam of 58 is rotated 90° in a clockwise direction the follower will rise from the point 172 to the point 174 on the cam surface 58. For purposes of representation, the radius $r_3$ between the axis of rotation and point 174 is equal to the radius $r_1$ minus $x$, $x$ being some fixed quantity depending upon the actuation distance required for the control member of the servomechanism. With this cam relationship as the cam is rotated 90° from its centered position at point 172 so that the follower resides at point 174, the wheel set 20 will rotate as illustrated in FIG. 15b through 45° so that its turning radius will be $R_2$. Likewise, when the cam 58 is rotated 90° in the counterclockwise direction the cam follower 102 will drop to the point 170 on the cam surface. For purposes of illustration, the radius $r_2$ between the point 170 on the cam surface and the axis of rotation 166 is equal to $r_1$ minus $x$. When the cam 58 is rotated in the clockwise direction so that the cam follower 102 resides at point 174 on the cam surface, the wheel set 20 will be rotated 45° in the counterclockwise direction so that its turning radius will be $R_3$.

Figure 15D:
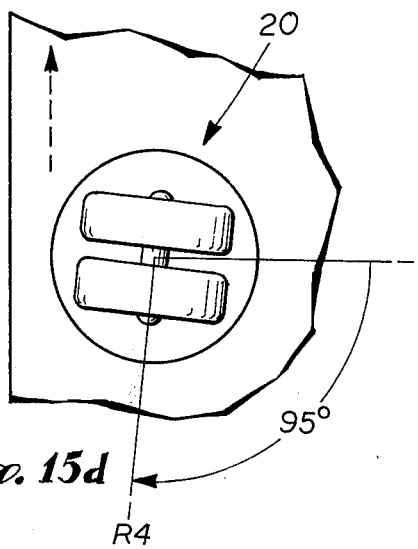
Figure 15C:
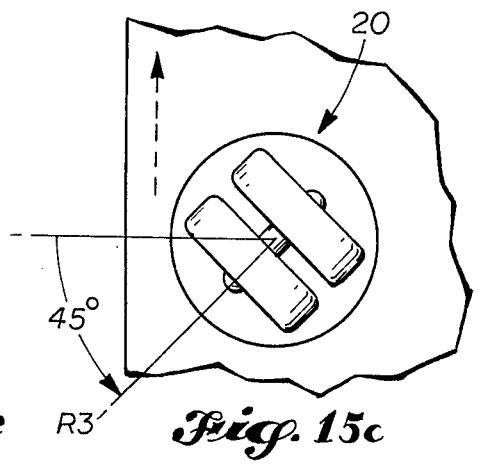
Figure 15E:
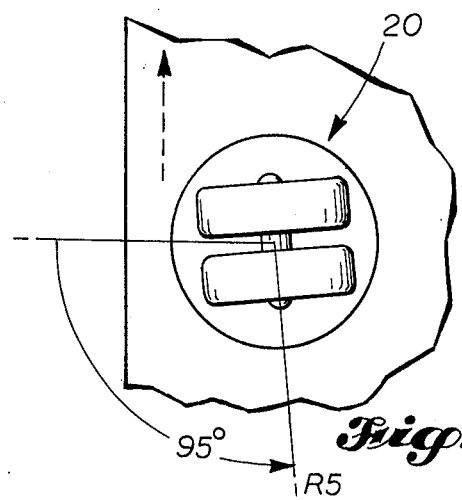

In a similar manner, the length of the radius $r_5$ of the cam between the rotational axis 166 and the point 176 on the cam surface is equal to the radius $r_1$ plus some quantity $y$ greater than $x$. In a similar manner, the length of radius $r_4$ between the rotational axis 166 and the lowest point 168 on the cam surface is chosen to be equal to $r_1$ minus $y$. As illustrated in FIG. 15d when the cam 58 is rotated in a counterclockwise direction through approximately 180° so that the cam follower 102 resides substantially at point 168 on the cam surface, the wheel set will rotate through 95° in a clockwise direction so that the wheel set 20 will have a turning radius of $R_4$. In a similar manner, when the cam 58 is rotated in a clockwise direction so that the follower 102 resides substantially at point 176 on the cam surface, the wheel set 20 will rotate through approximately 95° in the counterclockwise direction giving the wheel set 20 a turning radius of $R_4$.

The representative cam illustrated in the FIG. 14 is representative of cams in the oblique steering mode cam set. It will be understood by one of ordinary skill in the art that the varying radiuses of the cam can be chosen as desired to position the corresponding wheel set at any given angular position desired dependent upon the angular position of the cam itself. In this manner, the several cams in a set can be designed so that they program the turning of several independently steerable wheel sets so that each resides in a desired position for a given rotation of the cam set relative to the location of the followers.

The present invention has been described in relation to a preferred embodiment. After reading the foregoing specification, one of ordinary skill in the art will be able to effect various changes, substitutions of equivalents, and other alterations without departing from the scope and intent of the invention as disclosed herein. It is therefore intended that the scope of protection granted by patent be limited only by the definition contained in the appended claims.

What is claimed is:

1. In a steering system for a wheeled vehicle including a vehicle frame, a steerable wheel supporting member mounted for rotation about an axis on said frame, a reversible motor means for varying the angular position of said steerable member relative to said frame to steer a wheel supported by said member, a servomechanism operably coupled to said motor means and having a control member for controlling said motor means, an improvement for actuating said control member comprising:
    a. a first cam and a second cam, each of said cams having a predetermined shape and a rotational axis,
    b. coupling means for interconnecting said cams and for mounting said cams for rotation about their respective rotational axes,
    c. an operator controlled steering means operably connected to said coupling means for rotating said cams responsive to a command from an operator,
    d. follower means for contacting said first cam and for converting the rotational movement of said first cam into linear movement, said follower means being coupled to actuate the control member of said servomechanism to control said motor means, said follower means including
        i. a first member having a channel therein and first means mounting said first member for reciprocating movement in a radial direction relative to the rotational axes of said cams, said channel being oriented generally parallel to the direction of reciprocation of said first member,
        ii. a second member mounted for reciprocating movement in the channel of said first member,
        iii. a cam follower having an end thereof contacting the cam surface of one of said cams, said cam follower being connected to said second member,
        iv. second means biasing said follower means toward said cam surface, and
        v. third means for biasing said second member toward said cam surface relative to the position of said first member, and
    means for relatively axially shifting said first and second cams and said follower means so that said follower means is shifted relative to said first cam and is positioned to contact said second cam and to convert rotational movement of said second cam into linear movement to actuate said control member and control said motor means.

2. The improvement of claim 1 wherein said third means has a greater biasing force than said second means.

3. The improvement of claim 2 wherein said third biasing means comprises a spring mounted in compression in the channel in said first member.

4. The improvement of claim 2 wherein said second means comprises:
    first and second arms affixed to and extending transversely outwardly in mutually opposing directions from said second member,
    a first extensible spring coupled to said first arm and a second extensible spring coupled to said second arm, said first and second springs being operably fixed relative to said coupling means to bias said follower means toward said cam surface.

5. In a steering system for a wheeled vehicle including:
    a vehicle frame,
    a plurality of steerable wheel supporting members mounted for rotation about mutually parallel axes on said frame, each of said wheel supporting members having a reversible motor means for varying the angular position of said steerable member relative to said frame to steer the wheel supported by said member, and a servomechanism operably coupled to said motor means and having a control member for controlling said motor means, and
    an operator controlled steering means,
    the improvement for translating the motion of said operator controlled steering means to actuate the control member of said servomechanism comprising:

a. a housing,
b. a shaft mounted in said housing for rotation about its rotational axis and for axial movement relative to its rotational axis,
c. a plurality of axially spaced cam groups fixed to said shaft, each of said cam groups having at least a first and second cam corresponding to first and second cams in the remainder of said cam groups, each of said first and second cams having a cam surface, said first cams forming a first set for steering said vehicle in a predetermined steering mode, said second cams forming a second set for steering said vehicle in a second predetermined mode,
d. a plurality of follower means mounted in said housing for reciprocating movement in a radial direction relative to said cams, each follower means being associated with and corresponding to one of said cam groups, said follower means for simultaneously contacting one of said sets of cams,
e. a plurality of cables and a sheath housing each of said plurality of cables for reciprocating movement therein, one end of each of said cables being associated with and connected to a corresponding one of said follower means, the corresponding end of each sheath being affixed to said housing, the other end of said cable being affixed to a corresponding control member of a corresponding one of said plurality of wheel supporting members,
f. means for translating the motion of said operator controlled steering means to rotary motion in said shaft,
g. means for axially shifting said shaft relative to said plurality of follower means so that said plurality of follower means is disengaged from one of said sets of cams and is engaged with another of said sets of cams, and
h. means for lifting said follower means away from said cam surfaces as said cams and said follower means are being relatively axially shifted including
  i. a first arm oriented transversely relative to the direction of reciprocation of said follower means and mounted to reciprocate in a direction generally parallel to the direction of reciprocation of said follower means, said first arm being oriented so as to be moveable between a first position and a second position displaced away from said cam relative to said first position, and
  ii. a second arm coupled to said follower means, said first arm in said first position being disengaged from said second arm, said first arm in said second position engaging said second arm and causing said second arm to move said follower means radially away from said cam surface.

6. The system of claim 5 further comprising:
i. a shaft extension coupled coaxially to said shaft, said shaft extension being coupled to axially shift said shaft relative to said follower means, said shaft being coupled to said shaft extension for rotation relative thereto, j. an arm pivotally attached to said shaft extension, said arm being oriented transversely relative to the rotational axis of said shaft, for pivotal movement about a pivotal axis oriented generally transversely relative to the rotational axis of said shaft,
k. first linearly acting power means having a drive member moveable between at least a first and second position in a direction generally parallel to the rotational axis of said shaft, and
l. a second linearly acting power means having a member moveable between at least a first and second position in a direction generally parallel to the rotational axis of said shaft, the moveable member of said first power means being pivotally attached to one end of said arm, the moveable member of said second power means being pivotally attached to the opposite end of said arm, the pivotal attachments of said moveable members to said arm being located on mutually opposite sides of the location of the pivotal attachment of said arm to said shaft extension, said arm being located in a first position wherein said follower means reside over and contact said first set of cams when said first and second power means are positioned respectively in their first and first positions, said arm being shifted to a second position wherein said shaft is axially moved so that said follower means reside over and contact said second set of cams when said first and second power means are respectively in their first and second positions, and said arm being shifted to a third position wherein said shaft is axially moved so that said follower means reside over and contact said third set of cams when said power means are respectively in their second and second positions.

7. In a steering system for a wheeled vehicle including a vehicle frame, a steerable wheel supporting member mounted for rotation about an axis on said frame, a reversible motor means for varying the angular position of said steerable member relative to said frame to steer a wheel supported by said member, a servomechanism operably coupled to said motor means and having a control member for controlling said motor means, an improvement for actuating said control member comprising:

a first cam, a second cam and a third cam, each of said cams having a predetermined shape and a rotational axis,
a coupling shaft mounted for rotation relative to a frame and interconnecting said cams for rotation about their respective rotational axes,
an operator controlled steering means operably connected to said coupling means for rotating said cams responsive to a command from an operator,
follower means for contacting said first cam and for converting the rotational movement of said first cam into linear movement, said follower means being coupled to actuate the control member of said servomechanism to control said motor means, and
means for relatively axially shifting said first, second and third cams and said follower means so that said follower means is shifted relative to said first cam to contact one of said second and third cams and to convert the rotational movement of said one of said second and third cams into linear movement to actuate said control member and to control said motor means, said means for shifting including an arm and mounting means mounting said arm to said shaft for rotation relative to said shaft and for pivotally attaching said arm to said shaft for rotation about an axis oriented generally transversely relative to the rotational axes of said cams, said arm being oriented generally transversely relative to the rotational axes of said cams, first linearly acting power means having a member moveable between at least a first and a second position, and a second linearly acting power means having a member moveable between at least a first and second position, the moveable member of said first power means being pivotally attached to one end of said arm, the moveable member of said second power means being pivotally attached to the opposite end of said arm, the pivotal attachments of said moveable members to said arm being on mutually opposite sides of the location of the pivotal attachment of said arm to said shaft, said arm being located in a first position wherein said follower means resides over the surface of said first cam when said first and second power means are positioned respectively in their first and first positions, said arm being shifted to a second position wherein said shaft is axially moved so that said follower means resides over said second cam when said first and second power means are respectively in their first and second positions, said arm being shifted to a third position wherein said shaft is axially moved so that said follower means resides over said third cam when said first and second power means are respectively in their second and second positions.

8. In a steering system for a wheeled vehicle including a vehicle frame, a plurality of steerable wheel supporting members mounted for rotation about mutually parallel axes on said frame, each of said wheel supporting members having a reversible motor means for varying the angular position of a respective steerable member relative to said frame to steer the wheel supported by said member, and having a servomechanism operably coupled to said motor means, said servomechanism having a control member for controlling said motor means, an improvement for actuating the control member associated with each of said wheel supporting members comprising:

a plurality of axially spaced cam groups and coupling means for interconnecting and mounting said cams for rotation about their respective rotational axes, each of said cam groups having at least a first and second cam corresponding to first and second cams in the remainder of said cam groups, each of said first and second cams having a cam surface, said first cams forming a first set for steering said vehicle in a first predetermined steering mode, said second cams forming a second set for steering said vehicle in a second predetermined steering mode, an operator controlled steering means operably connected to said coupling means for rotating said cams responsive to a command from an operator, a plurality of follower means simultaneously contacting one of said sets of cams, each of said follower means being associated with and corresponding to one of said cam groups, each of said follower means being operably associated with a respective servomechanism on each of said plurality of wheel supporting members to actuate a respective control member to control a respective motor means, means associated with said cams for mounting said follower means for reciprocating movement in a generally radial direction relative to the rotational axes of said cams, means for relatively axially shifting said cams and said plurality of follower means so that said plurality of follower means is shifted relative to the first cam in each of said cam groups and positioned to contact a second cam in each of said cam groups and to convert the rotational movement of said second cam in each of said cam groups into linear movement to actuate a respective control member to control a respective motor means, and means for simultaneously moving said plurality of follower means away from said cams in a generally radial direction relative to the rotational axes of said cams when said cams and said plurality of follower means are being relatively axially shifted.

9. In a steering system for a wheeled vehicle including a vehicle frame, a steerable wheel supporting member mounted for rotation about an axis on said frame, a reversible motor means for varying the angular position of said steerable member relative to said frame to steer a wheel supported by said member, a servomechanism operably coupled to said motor means and having a control member for controlling said motor means, an improvement for actuating said control member comprising:

a. a first cam and a second cam, each of said cams having a predetermined shape and a rotational axis, b. coupling means for interconnecting said cams and for mounting said cams for rotation about their respective rotational axes, c. an operator controlled steering means operably connected to said coupling means for rotating said cams responsive to a command from an operator, d. follower means for contacting said first cam and for converting the rotational movement of said first cam into linear movement, said follower means being coupled to actuate the control member of said servomechanism to control said motor means, said follower means being mounted to reciprocate in a generally radial direction relative to the axes of rotation of said cams, e. means for relatively axially shifting said first and second cams and said follower means so that said follower means is shifted relative to said first cam and is positioned to contact said second cam and to convert rotational movement of said second cam into linear movement to actuate said control member and control said motor means, and f. means for lifting said follower means away from said cam surface as said cams and said follower means are being relatively axially shifted, said means for lifting including i. a first arm oriented transversely relative to the direction of reciprocation of said follower means and mounted to reciprocate in a direction generally parallel to the direction of reciprocation of said follower means, said first arm being oriented so as to be moveable between a first position and a second position displaced from said cam relative to said first position, and ii. a second arm coupled to said follower means, said first arm in said first position being disengaged from said second arm, said first arm in said second position engaging said second arm and causing said second arm to move radially away from said cam surface, thereby causing said follower means to lift away and disengage from said cam surface.

10. In a steering system for a wheeled vehicle including:
a vehicle frame,
a plurality of steerable wheel supporting members mounted for rotation about mutually parallel axes on said frame, each of said wheel supporting members having a reversible motor means for varying the angular position of said steerable member relative to said frame to steer the wheel supported by said member, and a servomechanism operably coupled to said motor means and having a control member for controlling said motor means, and
an operator controlled steering means,
the improvement for translating the motion of said operator controlled steering means to actuate the control member of said servomechanism comprising:
a housing,
a shaft mounted in said housing for rotation about its rotational axis and for axial movement relative to its rotational axis,
a plurality of axially spaced cam groups fixed to said shaft, each of said cam groups having at least a first and second cam corresponding to first and second cams in the remainder of said cam groups, each of said first and second cams having a cam surface, said first cams forming a first set for steering said vehicle in a predetermined steering mode, said second cams forming a second set for steering said vehicle in a second predetermined mode,
a plurality of follower means mounted in said housing for reciprocating movement in a radial direction relative to said cams, each follower means being associated with and corresponding to one of said cam groups, said follower means simultaneously contacting one of said sets of cams,
a plurality of cables and a sheath for each of said plurality of cables, one end of each of said cables being associated with and connected to a corresponding one of said follower means, the corresponding end of each sheath being affixed to said housing, the other end of said cable being affixed to a corresponding control member of a corresponding one of said plurality of wheel supporting members,
means for translating the motion of said operator controlled steering means to rotary motion in said shaft,
means for axially shifting said shaft relative to said plurality of follower means so that said plurality of follower means is disengaged from one of said sets of cams and is engaged to contact another of said sets of cams, and
means for simultaneously lifting said plurality of follower means away from said cam surfaces in a radial direction relative to said cams as said shaft is axially shifted relative to said cams.

* * * * *